United States Patent [19]

Song

[11] 4,001,484
[45] Jan. 4, 1977

[54] TRANSPARENT SOLVENT AND HEAT RESISTANT TERPOLYMER COMPOSITIONS

[75] Inventor: Il H. Song, Lombard, Ill.

[73] Assignee: The Richardson Company, Des Plaines, Ill.

[22] Filed: May 20, 1974

[21] Appl. No.: 471,488

[52] U.S. Cl. .............................. 526/329; 526/222
[51] Int. Cl.² ..................................... C08F 220/14
[58] Field of Search ................ 260/80, 81; 526/329

[56] References Cited
UNITED STATES PATENTS

| | | | |
|---|---|---|---|
| 2,851,447 | 9/1958 | Wesp et al. | 260/80.5 |
| 3,792,125 | 2/1974 | Wefer | 260/876 R |

Primary Examiner—Stanford M. Levin
Attorney, Agent, or Firm—Alan M. Abrams

[57] ABSTRACT

The present disclosure concerns a composition comprising a copolymer product of a vinyl aromatic monomer selected from the group consisting of α-methylstyrene, 2-methylstyrene and tertiary butylstyrene, methyl methacrylate, and acrylonitrile or methacrylonitrile monomers which are polymerized at regulated conditions to produce a terpolymer having a disclosed weight ratio of vinyl aromatic to methyl methacrylate to acrylonitrile or methacrylonitrile. The present composition is thought to be useful for applications in which clear solvent resistant polymeric compositions are required which also have high heat resistance evidenced by high heat deflection temperatures. Such composition possesses unique properties which can be exploited through recognized molding procedures to produce many household appliances which must be subjected to high temperatures, possess substantial clarity and reasonable chemical inertness.

2 Claims, No Drawings 4,001,484

TRANSPARENT SOLVENT AND HEAT RESISTANT TERPOLYMER COMPOSITIONS

BACKGROUND OF THE INVENTION

1. Field of the Invention

The field of art to which this invention pertains is terpolymer molding compositions made up of a chemically reacted mixture of vinyl aromatics, methyl methacrylate, and acrylonitrile or methacrylonitrile monomers.

2. Description of the Prior Art

Commercially available styrene-acrylonitrile copolymer resins are thought to have excellent chemical resistance and good clarity but their heat distortion properties preclude their use in the presence of steam or high temperature applications. Additionally, polycarbonate resins, which are clear and possess excellent heat distortion properties, are not resistant to a wide variety of chemicals especially those found in many households.

The present terpolymer combination of polymerized vinyl aromatic, methyl methacrylate, and acrylonitrile or methacrylonitrile monomer possess all three of these properties having excellent chemical resistance, exceptional clarity and the ability to withstand relatively high temperatures before distortion properties are affected. More particularly, when vinyl aromatic, methyl methacrylate and acrylonitrile or methacrylonitrile terpolymer product is produced, the ratio of the monomers must be varied so as to prevent the production of a terpolymer composition which would contain more than a few tenths of a weight percent of unreacted monomer. Such unreacted monomer has been found to degrade the high heat distortion properties of such terpolymer products. Additionally, the ratios of the three monomer precursors must be varied so as to produce the required properties of the terpolymer, namely—clarity, solvent resistance and high heat distortion temperatures.

I have found that by reacting vinyl aromatic, methyl methacrylate and, acrylonitrile or methacrylonitrile monomers at polymerization conditions to produce a terpolymer having a weight ratio of vinyl aromatic to methyl methacrylate to acrylonitrile or methacrylonitrile units of from about 25 to 40: 50 to 65: 5 to 10 respectively and producing a finished product with less than about one-half of one percent by weight of unreacted monomer materials from the above described reactants, that a material possessing good clarity, resistance to deformation at high temperatures and good solvent resistance can be produced.

SUMMARY OF THE INVENTION

My invention can be summarized as a clear, solvent resistant, heat resistant terpolymer molding composition which comprises a reaction product of vinyl aromatic, methyl methacrylate, and acrylonitrile or methacrylonitrile which are reacted to produce a terpolymer having a weight ratio of the above three monomer units of from 25 to 40: 50 to 65: and 5 to 10 respectively, and maintaining less than about one-half of one weight percent of the composition as unreacted monomer.

In a broad embodiment my invention relates to a transparent, solvent resistant, high heat terpolymer composition comprising the reaction product of vinyl aromatic, methyl methacrylate, and acrylonitrile or methacrylonitrile monomers polymerized at polymerization conditions to produce a terpolymer having a weight ratio of vinyl aromatic to methyl methacrylate to acrylonitrile or methacrylonitrile units of from about 25 to 40: 50 to 65: and 5 to 10 respectively, said composition having less than about 0.5 percent by weight unreacted monomer from the above described reactants.

In a more specific embodiment my invention relates to a transparent, solvent resistant, high heat terpolymer composition comprising the reaction product of from about 25 to 40 weight percent $\alpha$-metnylstyrene, 50 to 65 weight percent methyl methacrylate and 5 to 10 weight percent acrylonitrile or methacrylonitrile monomers polymerized at reaction conditions to produce a terpolymer having a weight ratio of $\alpha$-methylstyrene, methyl methacrylate and acrylonitrile or methacrylonitrile units of from about 25 to 40: 50 to 65: and 5 to 10 respectively, said composition having less than about 0.5 weight percent of unreacted monomer reactants in the final composition.

DETAILED DESCRIPTION OF THE INVENTION

The present invention relates to terpolymers having good clarity and solvent resistance and able to withstand reasonably high temperatures without distortion. Specifically such compositions are produced by copolymerizing vinyl aromatics such as $\alpha$-methylstyrene, 2-methylstyrene or tertiary butylstyrene, methyl methacrylate, and acrylonitrile or methacrylonitrile at reaction conditions to form a polymerized terpolymer composition having vinyl aromatic, methyl methacrylate and acrylonitrile or methacrylonitrile units in a certain predetermined weight ratio. Such composition additionally contains less than about one-half weight percent of the total composition of unreacted monomers.

Preferably the reactant monomers are present in a weight ratio of vinyl aromatic to methyl methacrylate to acrylonitrile or methacrylonitrile of from about 25 to 40: 50 to 65: and 5 to 10 respectively. Ideally such monomers are fully reacted to produce a terpolymer containing substantially the same weight ratio of respective monomer units as present in the reactant mixture. It is especially preferred that essentially no unreacted monomers be present in the claimed composition since, in many instances, such materials readily degrade the high temperature performance of the molded compositions.

It is especially preferred that such compositions contain less than about 0.5 weight percent of unreacted monomers from the above described reactants. In an even more preferred instance the composition should contain less than about 0.2 weight percent of unreacted monomer or monomers from the above described reactants. It is even more preferable to substantially eliminate any unreacted monomers from the above composition by maintaining the polymerization conditions and reactant weight ratios at such conditions as to entirely react the reactant monomers into the product terpolymer.

It is preferred that the terpolymers contain substantially identical weight ratios as the reactant materials, that is—from about 25 to 40 weight percent of vinyl aromatic units, 50 to 65 weight percent methyl methacrylate units, and 5 to 10 weight percent acrylonitrile or methacrylonitrile units in the final terpolymer composition. In an even more preferred instance the ratio of the above is on a weight percent basis about 30 to 35: 55 to 65: and 5 to 10 respectively. An especially preferred composition contains a weight ratio of $\alpha$- methylstyrene to methyl methacrylate to acrylonitrile of 30:60:10.

Such ratios can be varied in order to produce a terpolymer having clarity, solvent resistance and a high heat deflection temperature. More specifically it is preferred that the above described weight ratios be monitored and regulated so as to produce a molded composition which, according to the ASTM D-648-72* testing procedure, will yield an annealed heat distortion temperature under load of greater than about 250° F. In an even more preferred instance, the heat deflection temperature under load will be from above 250° to 255° to 260° F or higher. It has been found that free monomer in the terpolymer will degrade the annealed heat distortion temperature under load. Accordingly, Applicant has required that his composition contain a minimum quantity of free monomer in the claimed composition. Clarity can be reduced from two factors, namely—increased quantities of acrylonitrile and free homopolymer in terpolymer mixture composition. If less than 5 weight percent of acrylonitrile or methacrylonitrile is used low solvent resistance occurs while if greater than 10 percent is present the clarity is reduced.

* At 264 psi

In producing the terpolymers obtained in the present invention it is preferable to use an emulsion polymerization process. In using such an emulsion process fine polymer particle formation and incomplete conversion of monomer to polymer usually observed in such emulsion polymerization can be overcome through the proper choice of one or more emulsifiers. An elevated temperature coagulation method was found for making the claimed product, forming large easily filterable polymer particles which when molded produced a clear molded product. Preferably, the coagulation step is performed using sodium carbonate and the emulsion step performed in aqueous medium.

The vinyl aromatic monomer is selected from the group of α-methylstyrene, 2-methylstyrene or tertiary butylstyrene. These particular monomers all possess high glass transition temperatures making them ideal for the present composition.

EXAMPLE I

In a resin kettle, equipped with a stirrer, a thermometer and a nitrogen inlet tube, there were placed 1200 grams of deionized water, 4 grams of sodium dodecylbenzene sulfonate, 140 grams of α-methylstyrene, 220 grams of methyl methacrylate, 40 grams of acrylonitrile, 2 grams of tertiary dodecyl mercaptan and 1.6 grams of potassium persulfate.

The mixture was stirred under a nitrogen blanket for a period of about 5 hours at approximately 70° C. The final conversion of monomer to polymer as indicated by analytical testing was found to be essentially 100%, leaving a finalized composition containing essentially no unreacted monomer.

The emulsion polymer obtained was then coagulated with a 5% aqueous calcium chloride solution at 90° C. The coarse particles of coagulated terpolymer were collected on a filter, washed with water and then dried in a vacuum oven at 70° for eighteen hours. The dried polymer had no detectable amount of residual monomers. Such product had a melt flow of 0.91 at 230° C. under a 3.8 kilogram load. The material was compression molded at 400° F. to give a clear, substantially colorless plaque which had an annealed heat distortion temperature of 259° F. at 264 p.s.i.

EXAMPLE II

Following the method for production of a terpolymer as described above a series of terpolymers was prepared in emulsion from the reactant materials and in the weight ratios indicated in the Table below. The products obtained in each case were compression molded. The heat distortion temperature and percent haze of the clear plaques were then determined. Clarity was determined by visual inspection and is considered to be accurate for the relative clarities found. Haze was determined using ASTM method D-1003.

TABLE

| Weight Ratio AMS: MMA: AN | Annealed DTL, ° F. | Clarity[1] | % Haze |
|---|---|---|---|
| 25:65:10 | 249 | C | 3.7 |
| 30:60:10 | 255 | VC | 3.4 |
| 35:50:15 | 245 | VSH | 7.3 |
| 35:45:20 | 244 | H | 11.1 |
| 35:55:10 | 259 | VC | 3.5 |
| 30:65:5 | 258 | VC | 2.9 |
| 30:65:5[2] | 260 | VC | 7.5 |

[1]VC = Very Clear
C = Clear
VSH = Very Slight Haze
H = Haze
[2]Methacrylonitrile substituted for acrylonitrile

EXAMPLE III

The solvent resistance of a 30:60:10 AMS:MMA:AN terpolymer was evaluated using compression molded strips. The terpolymer showed no weight gain or surface attack in gasoline or turpentine immersion tests for one week at room temperature. Compression molded one-half by six by one sixteenth inch thick strips of terpolymer showed no visible stress cracking after 24 hours exposure to butter, vegetable oil, hair spray lotion or facial cleanser when stressed on elliptical bending forms at maximum strain levels of 0.27 percent.

I claim as my invention:

1. A transparent, solvent resistant, high heat terpolymer composition comprising the reaction product of (a) a vinyl aromatic monomer selected from the group consisting of α-methylstyrene, 2-methylstyrene and tertiary butylstyrene, (b) methyl methacrylate, and (c) acrylonitrile or methacrylonitrile monomers polymerized at polymerization conditions to produce a terpolymer having a weight ratio of said vinyl aromatic to methyl methacrylate to acrylonitrile or methacrylonitrile units of from about 30 to 35: 55 to 65: and 5 to 10 respectively, said composition having less than about 0.5 percent by weight unreacted monomer of any of the initial reactants, said composition being further characterized by having an annealed heat distortion temperature at 264 psi greater than 250° F. as determined by ASTM D-648-72 test.

2. A composition as described in claim 1 wherein said weight ratios are from about 30:60:10.

* * * * *